April 14, 1931.         C. GRANBERG         1,800,622
                   POTATO DIGGING MACHINE
              Filed May 13, 1929    5 Sheets-Sheet 3

Fig. 3

Carl Granberg
Inventor

By C.A. Snow & Co.
Attorneys

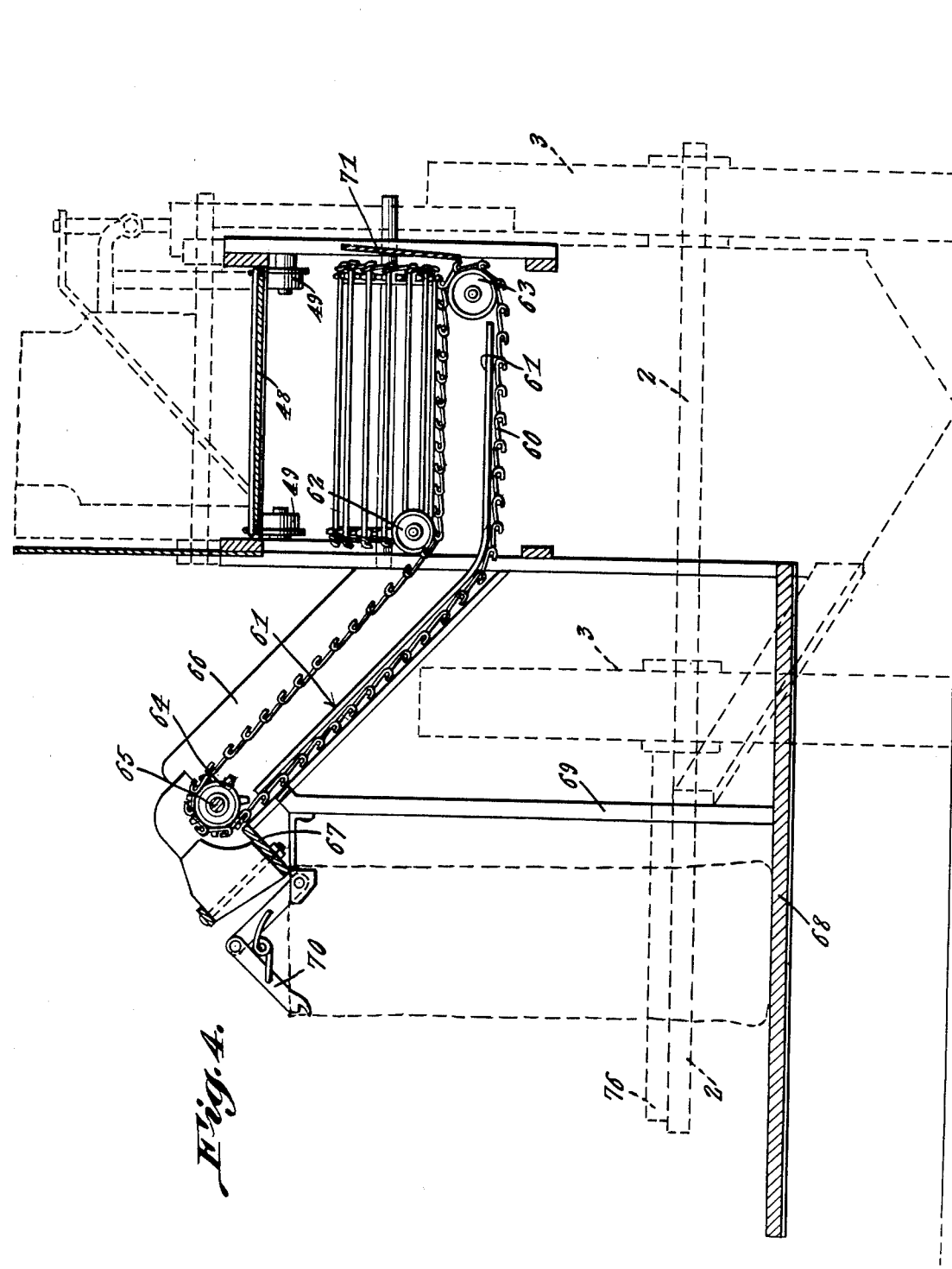

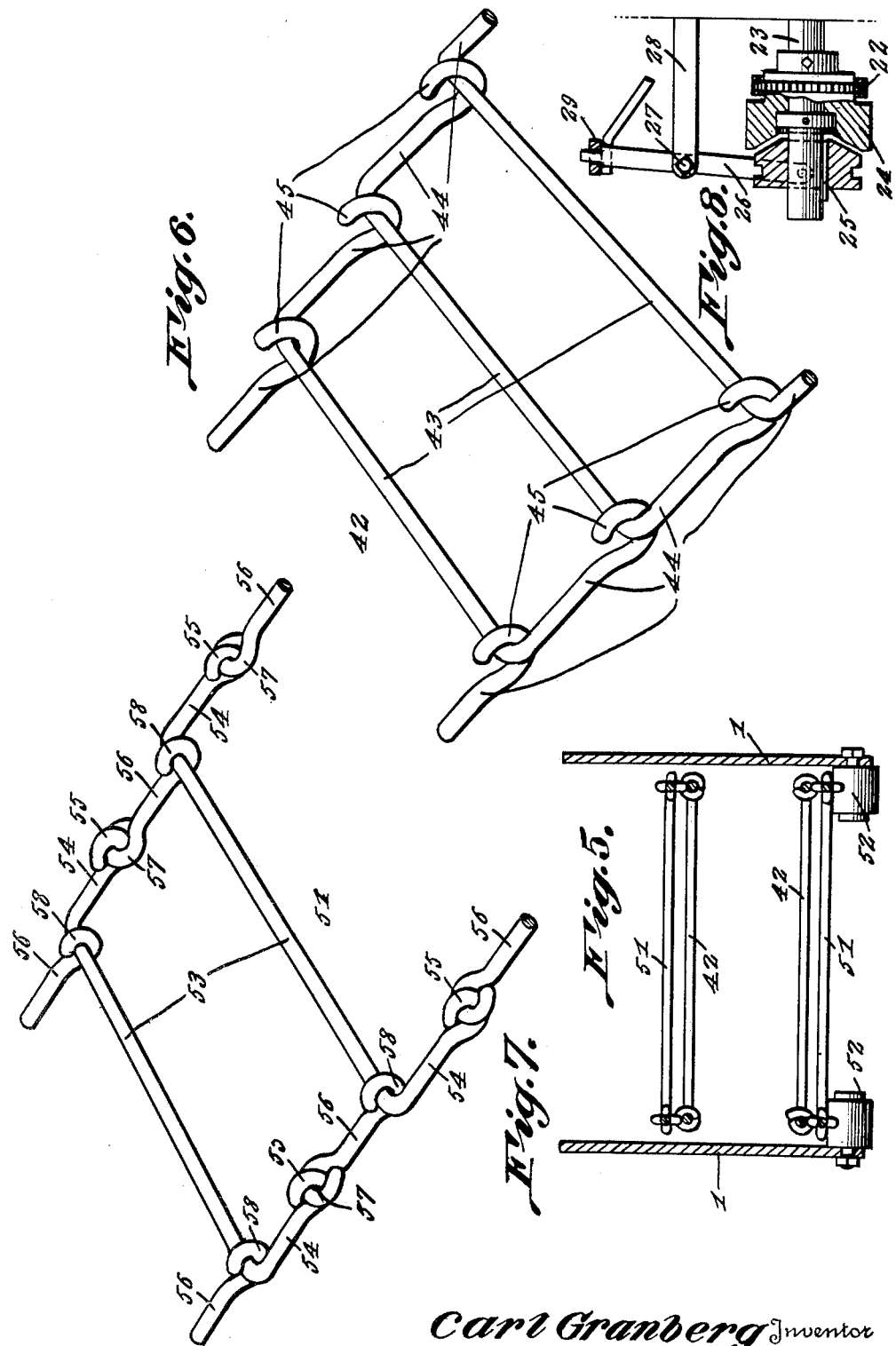

Patented Apr. 14, 1931

1,800,622

UNITED STATES PATENT OFFICE

CARL GRANBERG, OF FIRTH, IDAHO

POTATO-DIGGING MACHINE

Application filed May 13, 1929. Serial No. 362,668.

This invention relates to potato diggers, one of the objects being to provide a compact machine of this type designed to dig, clean and sack the potatoes while the machine is travelling along the rows.

Another object is to provide a machine of this type which is of the minimum size and which can either sack the potatoes when cleaned or can deliver them laterally into a truck or the like whereby the potatoes can be placed in storage without the necessity of extra handling.

Another object is to provide a potato digger which delivers the vines on to the row from which the potatoes have been removed and not between rows where they would interfere with subsequent digging operations.

A further object is to provide a machine so proportioned that it can dig potatoes at the ends of the rows much more readily than heretofore and can be more readily turned, thereby avoiding the necessity of digging ends of rows by hand.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 3 is a vertical longitudinal section on line 3—3, Figure 1, certain of the parts being in elevation.

Figure 4 is an enlarged section on line 4—4, Figure 1, certain of the parts being shown in elevation and portions of the machine being indicated by broken lines.

Figure 5 is a section on line 5—5, Figure 2.

Figure 6 is a perspective view of a portion of the potato conveyor.

Figure 7 is a perspective view of a portion of the vine conveyor.

Figure 8 is a section through the clutch and adjacent parts.

Figure 1:
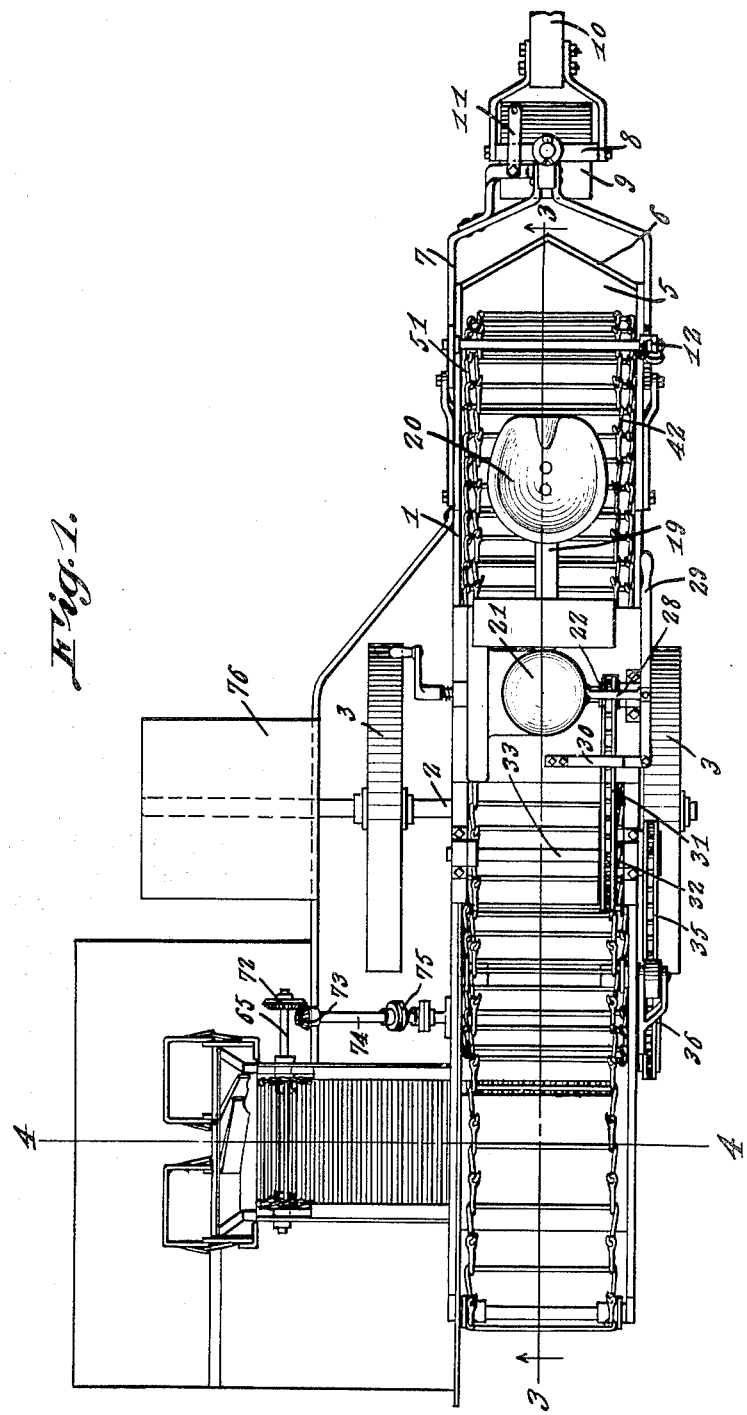
Figure 1 is a top plan view of the machine.
Figure 2:
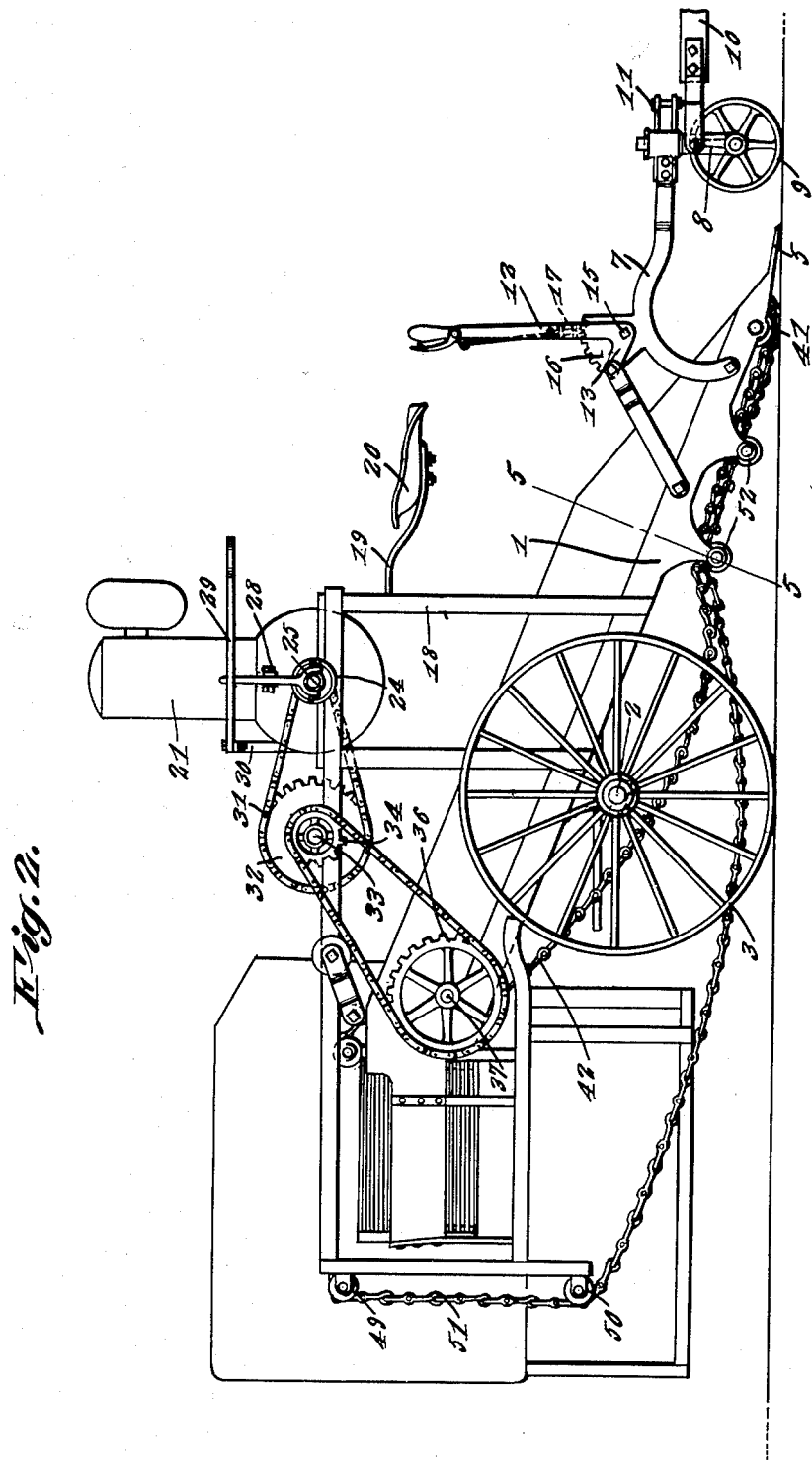
Figure 2 is a side elevation thereof.

Referring to the figures by characters of reference, 1 designates the main frame of the elevator supported, at a point between its ends, on an axle 2 carried by wheels 3. It is designed to balance the machine on this axle so that it can be tilted readily to raise or lower the digging blade 5 which is secured to and located between the sides of the frame 1 at the front ends thereof. The forward end of the digging blade has sharp edges which converge forwardly as indicated at 6 so that the blade can cut readily into the soil as the machine moves forwardly, thereby lifting the potatoes to the surface.

A beam 7 straddles and is pivotally connected to the forward end of the frame 1 and extends forwardly to a yoke 8 supported by a caster 9. A tongue 10 is connected to the yoke 8 and is adapted to swing freely upwardly and downwardly relative thereto while the machine is being drawn over a field by a tractor or by horses. If desired an evener, not shown, can be connected to a clevis 11 extending from the upper portion of the yoke.

A lever 12 is extended upwardly from the beam 7 and has an arm 13 connected by straps 14 to the sides of the frame 1. Thus by shifting lever 12 about its pivot 15 the front of the frame can be raised or lowered as will be obvious. Lever 12 can be held in any position to which it may be moved by means of a toothed segment 16 adapted to be engaged by a dog 17 carried by the lever.

Erected on the frame 1 is a supplemental frame 18 from which a spring tongue 19 may be extended for supporting the seat 20 to be occupied by the driver. A motor 21 is mounted on this supplemental frame and has a sprocket 22 loosely mounted on its shaft 23. At one side of this sprocket is a clutch member 24 adapted to be engaged by a shiftable clutch member 25 feathered on the shaft 23 and actuated by a lever 26. This lever, which is pivotally mounted at 27 in arm 28, is adapted to be shifted by a hand lever 29 fulcrumed on a bracket 30 at one end while its other end extends to a point where it can be reached readily by the occupant of the seat 20.

The sprocket 22 transmits motion through a chain 31 to a large sprocket 32 secured to a countershaft 33 journaled on the supplemental frame 18 and having a smaller sprocket 34 attached thereto. A chain 35 for transmitting motion from the sprocket 34 to a sprocket 36 is secured to one end of a shaft 37 extending transversely through the upper portion of the frame 1 and having conveyor sprockets 40 attached thereto.

Supported between the forward end portions of the sides of the frame 1 is a guide roller 41 and extending from this guide roller to the sprockets 40 is an endless potato conveyor 42. As shown particularly in Figure 6 this conveyor is made up of a plurality of cross rods 43 each provided with arms 44 terminating in eyes 45. These eyes engage the next adjoining rod and, as shown in Figure 6, when the several links of the chain are assembled the rods 43 will be spaced apart sufficient distances to support the potatoes while allowing dirt and trash to fall between the rods to the ground.

Elliptical sprockets 46 are mounted to rotate freely on the inner sides of the frame 1 and upon studs 47 or the like extending from the frame. These sprockets engage the upper flight of the chain 42 and when said chain is actuated in the direction indicated by the arrow in Figure 3, the sprockets, by rotating, will impart an up and down movement to the upper flight of the chain, thereby agitating the material supported thereby and separating the potatoes from any dirt or other undesirable material mixed therewith.

A platform or table 48 is extended over the rear portion of the supplemental frame and above the space back of the sprockets 40 and conveyor chain 42. Adjacent the front and back of this table are rollers 49 and additional rollers 50 are located near the bottom of the rear portion of the machine. These rollers 49 and 50 serve to support portions of a vine conveyor 51 the upper flight of which extends over the upper flight of the conveyor 42 but diverges upwardly and rearwardly therefrom. The forward portion of the conveyor 51 contacts with that portion of the conveyor 42 mounted on the roller 41 and the lower portion of the conveyor 51 extends over guide rollers 52 at which point said conveyor 51 supports a portion of the conveyor 42 as shown in Figure 3. The vine conveyor 51 has been shown in detail in Figure 7 and is made up of parallel rods 53 each of which is provided, at its ends, with arms 54 terminating in eyes 55. Links 56 are interposed between these arms and the next adjoining rod, there being an eye 57 at one end of each link for engaging the adjacent eye 55 and another eye 58 at the other end of each link through which the adjacent rod 53 extends. Thus it will be seen that a flexible conveyor is provided having sufficient clearance between the rods 53 to permit the potatoes and smaller lumps of dirt, stones and the like to pass therebetween on to the upper flight of the conveyor 42 while the vine will remain supported by the rods 53 and be carried upwardly thereby. During this upward movement of the vines the potatoes hanging therefrom between the rods 53 will be agitated by the rising and falling upper flight of conveyor 42 and so agitated as to be quickly separated from the vine, the potatoes passing rearwardly with the conveyor 42. In Figure 3 the vines have been shown at V and the potatoes have been shown at P.

The table 48 is flat and imperforate and its forward end is provided with a sharp edge indicated at 59 whereby, should any potatoes remain suspended from the vines as the vines approach the table 48, the vines will come against the cutting edge 59 and be severed from the depending potatoes.

Extending transversely of the machine within the rear portion thereof is a lateral conveyor 60 the lower flight of which is extended under a plate 61 one end of which is inclined laterally and upwardly beyond one side of the frame 1. Guide rollers 62 are provided for the upper flight of the conveyor chain 60 and additional guide rollers 63 are provided for said conveyor close to that side of the frame 1 remote from the inclined portion of the plate 61. Sprockets 64 are secured to a shaft 65 journaled in the upper ends of laterally inclined side boards 66 between which the conveyor 60 extends. The lower portion of the conveyor 60 is located beneath the table or platform 48 while the upper or inclined portion of said conveyor is adapted to deliver potatoes or the like into an outlet spout 67 located above a sack supporting platform 68 extending laterally from the machine. The side boards 66 can be reinforced by means of supports 69 extending upwardly from the platform 68. A suitable sack holder indicated generally at 70 is located at the outer end of the spout 67 so that material delivered from the spout will be directed into the open end of a supported sack.

A suitable arrangement of boards or plates 71 can be utilized adjacent to the lower portion of the conveyor 60 so as to properly guide potatoes or the like while being delivered from the conveyor 42 to the conveyor 60. Shaft 65 has a gear 72 secured thereto. This gear meshes with a gear 73 secured to a shaft 74 which is connected by a universal joint 75 to the shaft 37.

A small platform 76 may be extended laterally from the machine at a point in front of the sacking mechanism, this platform being used for supporting an operator engaged in filling the sacks.

It is believed that the operation of the machine will be apparent from the foregoing description. As the machine is drawn forwardly the conveyors are actuated by the motor 21 and the mechanism driven thereby. The blade 5 will dig under the potatoes and lift them to the surface and will also serve to guide them into engagement with the conveyor 51. The vines will be carried upwardly and rearwardly by this conveyor while the potatoes and other solids adhering thereto or mixed therewith will fall downwardly between the rods 53 on to the rods 43 of the conveyor 42. As this lower conveyor is agitated by the elliptical sprockets 46 the potatoes will be separated from the other solids, the latter dropping through the conveyor to the ground while the potatoes are carried upwardly and rearwardly. The agitation of the potatoes serves to detach them from the vine, the potatoes being delivered on to the lower portion of the conveyor 60 while the vines are carried over the table 48 and delivered on to the ground along the row from which the potatoes have been removed. The potatoes will be conveyed laterally and upwardly by the conveyor 60 and delivered into sacks placed therefor or, if preferred, the potatoes can be directed from the spout or spouts 67 directly into a wagon or truck travelling adjacent the machine. Thus the potatoes will not be delivered on to the ground but will be delivered to the sack or to a conveyance, thereby eliminating the handling heretofore necessary between the digging and cleaning of the potatoes and the sacking or storing of them.

What is claimed is:

1. A machine for digging potatoes including a wheel-supported structure, a lateral conveyor carried thereby, a flat, substantially horizontal table supported over said conveyor and extending rearwardly therebeyond, said table having a front cutting edge overlying the conveyor, a digging blade, upwardly and rearwardly diverging potato and vine conveyors extended from the blade, said potato conveyor constituting means for directing freed potatoes directly onto the lateral conveyor, and said vine conveyor constituting means for suspending potatoes by the vines and guiding them to the cutting edge of the table, said table constituting means for holding vines and material mixed therewith from falling downwardly onto the lateral conveyor following the severing operation.

2. A potato harvester including a wheel-supported structure, a lateral conveyor adjacent the rear end thereof, a digging blade adjacent the front end thereof, sacking means for receiving potatoes from the lateral conveyor, a table extending over the lateral conveyor and rearwardly therebeyond, said table being disposed substantially horizontally and being flat and imperforate, the forward edge of the table constituting a cutting edge, means for conveying loose potatoes from the blade to the lateral conveyor, and means thereabove for conveying the vines over the table and delivering them in rear of the lateral conveyor, the forward edge of the table constituting means for severing potatoes suspended from the vines and delivering them onto the lateral conveyor, and said table constituting means for preventing the severed vines and material mixed therewith from falling onto the lateral conveyor.

In testimony that I claim the foregoing as my own, I have hereto affixed my signature.

CARL GRANBERG.